Sept. 30, 1969 E. V. SPURR ET AL 3,469,425
APPARATUS FOR STRETCHING TUBING
Filed March 20, 1968
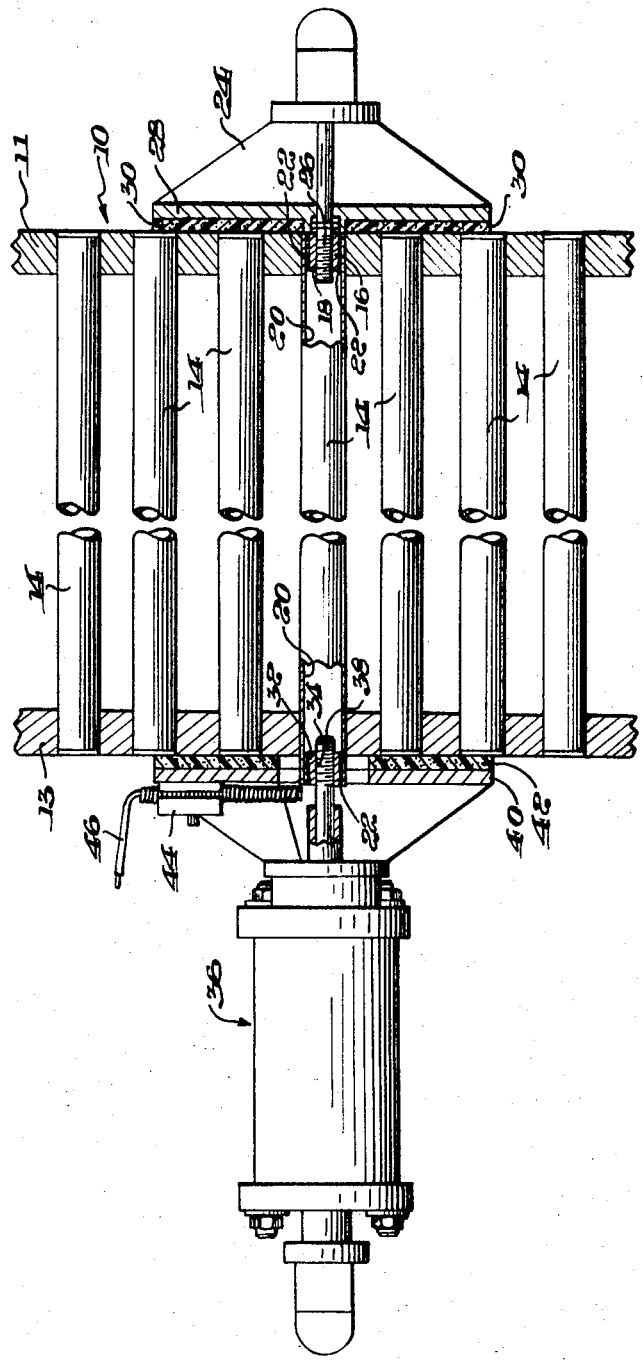
INVENTORS.
EUGENE V. SPURR,
ROBERT R. WALKER,
GEORGE W. STEINIGER.
BY
James A. Benneburg
their
ATTORNEY United States Patent Office 3,469,425
Patented Sept. 30, 1969

3,469,425
APPARATUS FOR STRETCHING TUBING
Eugene V. Spurr, Yalesville, Robert R. Walker, and George W. Steiniger, Wallingford, Conn., assignors to Allegheny Ludlum Steel Corporation, Brackenridge, Pa., a corporation of Pennsylvania
Filed Mar. 20, 1968, Ser. No. 714,651
Int. Cl. B21c 23/24; B21d 11/02, 17/02
U.S. Cl. 72—46                                    5 Claims

ABSTRACT OF THE DISCLOSURE

Apparatus for stretching metal tubing beyond its elastic limit without causing any appreciable change in tube diameter or wall thickness.

Background of the invention

This invention relates to an apparatus for stretching metal tubing and more particularly relates to an apparatus for stretching condenser tubes and the like beyond their elastic limit while in place in the condenser without removal of the condenser end bells and without causing any appreciable change in tube diameter or wall thickness or damage to the condenser or adjoining tubes.

Condenser tubes generally are of considerable length and small diameter; tubes sixty-five feet in length and less than one inch in diameter are common. Such tubing is subject to variations in length due to several reasons so that it is not unusual to find tubing that is too long or too short when it is being assembled into a condenser. For example, differences in length may be due to thermal effects resulting from the application of widely different temperatures at various stages during processing and assembly. Differences in length may also be due to variations in thickness of the end supports through which the tubes are assembled or further they may be due to the fact that the tubes were not originally fabricated to the required length. In any event, it is a common occurrence during the fabrication of condensers to have condenser tubes of incorrect length for assembly into the condenser.

When the tubes are too long, it is a relatively simple matter to cut them to the desired length. However, when a tube is too short, it was previously necessary to remove the condenser end bells and then the tube and replace it with one of sufficient length. The short tube must then be scrapped unless some other suitable use can be made of it. At best, a short tube results in time-consuming operations and in many instances such operations are extremely expensive, particularly when the tube cannot be salvaged.

It is, therefore, an object of this invention to provide an apparatus for stretching metal tubing.

It is a more particular object of this invention to provide an apparatus for stretching condenser tubes a predetermined distance beyond their elastic limit while the tubes are in position in the condenser without removal of the condenser end bells and without causing any appreciable change in the diameter or wall thickness of the tubes or damage to adjoining tubes or the condenser.

Summary of the invention

In accordance with the invention, apparatus has been invented such that a metal tube positioned between end supports can be plastically deformed to increase its length, without resulting in any appreciable change in the diameter or wall thickness of the tube.

To accomplish this result, in a preferred embodiment, inserts having a threaded bore therethrough and an outside diameter slightly smaller than the inside diameter of the tube are bonded to the interior wall of the tube, one immediately adjacent each of the tube ends. Power means, capable of effecting plastic deformation of the tube and having means connected thereto including a bearing plate disposed so that the bearing plate will abut one of the end supports, is threadably connected to one of the inserts. Anchoring means, including a bearing plate disposed so that it will abut the end support opposite that from the power means, is threadably connected to the other insert. A sensor means, operably connected to the power means, is disposed a predetermined distance externally of and adjacent to the end of the tube to which the power means is connected.

As the power means is operated, a stress is applied on the tube parallel to its longitudinal axis through the power means connected to the insert. The opposite end of the tube is held firmly in position by means of the connection between the anchoring means and the other insert. As continued stress is applied, the tube is stretched beyond its elastic limit until it comes into contact with the sensor means which in turn operates to cut off the power means and relieve the stress on the tube. The power means and anchoring means are then disengaged from the inserts and the inserts are removed from the bore of the tube.

Brief description of the drawing

The above and other objects and features of the in-invention will become apparent from the following detailed description taken in conjunction with the accompanying drawing which forms a part of this specification and in which:

The single figure is an assembly drawing of the apparatus of the invention partly schematic and partly in cross section with sections broken away to show detail, depicting a condenser tube in the process of being stretched.

Description

Referring now to the drawing for a clearer understanding of the nature of the invention, the numeral 10 represents a cut-away portion of an apparatus such as a condenser, evaporator or the like. The condenser includes end walls or supports 11 and 13 which, as well as defining the condensing chamber, act as end supports for the purality of tubes 14.

In apparatus such as condensers and the like, the tubes 14 would normally be mounted between end supports 11 and 13 and held in position by suitable bonding methods such as welding, brazing, soldering, and rolling and flaring. As previously mentioned, the lengths of these tubes can vary considerably due to processing variables so that frequently in assembling a given tube into the overall apparatus, its length is insufficient to permit its use. In those instances where only a small increase in length is needed to make the tube usable, it has been found that it is possible to exert sufficient longitudinal stress on the tube to deform it plastically and make it somewhat longer while it is in position between the end supports 11 and 13. Generally, only slight increases in length measured in fractions of inches are required; however, increases up to six inches have been achieved without producing any harmful effects in the tube.

Turning again to the drawing, there is shown attached to the centermost of the tubes 14 an apparatus for elongating a tube mounted between end supports through the application of longitudinally applied stress. The deforming stress is applied through a power means, here shown as a hydraulic cylinder arrangement 36. Obviously, other power means may be substituted for the hydraulic cylinder since it represents merely one method of generating sufficient stress to effect plastic deformation of the tube. Connected to the hydraulic cylinder is a bearing plate 40 disposed to abut against end support 13.

Since it is necessary for the power to be transmitted from the hydraulic cylinder 36 to the tube 14, means has been provided for operably connecting the power means to the interior wall of the tube so that a stress can be exerted on the tube substantially parallel to its longitudinal axis. This means shown is an insert 32, having a threaded bore 34 adapted to mate with the externally threaded piston portion 38 of cylinder 36. The insert 32 has an outside diameter only slightly smaller than the bore 20 of tube 14 and is bonded to the interior wall of tube 14 by an anaerobic compound 22. Obviously, any means can be used for effecting cooperative engagement between the power means and the interior wall of the tube limited only by its ability to withstand the stress necessary to effect plastic deformation of the tube, and the present arrangement is shown only by way of example.

Since a stress is to be applied to one end of the tube, it is obviously necessary that the opposite end of the tube be held firmly in its end support. To accomplish this, as shown here, an anchor means 24, including a bearing plate 28 is disposed to abut against end support 11, and a rod portion 26 is provided which is externally threaded to make with the internally threaded bore 18 of insert 16. The insert 16 is itself integrally attached to the inner walls of tube 14 by a suitable bonding agent such as an anaerobic compound 22. Again, as previously noted in the case of the power means, other means for effecting cooperative engagement between the anchor means and the interior wall of the tube can be substituted for the present arrangement which shown only by way of example.

Having thusly arranged the apparatus of the invention, as the power means is operated the tube is stretched a predetermined distance beyond its elastic limit so that when the stress is relieved the tube will be plastically increased in length sufficiently so that it can be bonded in the end supports. It is, of course, necessary to provide a means for determining when the tube has been plastically deformed sufficiently to accomplish this result. The means here provided is a pressure trip switch 44 disposed on the power means bearing plate 40 a predetermined distance from the end of tube 14, and which is operably connected to the power means 36 by lead wire 46. In operation, as the stress applied by the power means plastically lengthens the tube a distance to bring it into contact with the trip switch a signal from the switch stops the power means and relieves the applied stress on the tube. It is apparent that other means may be used to relieve the stress applied on the tube once it has been plastically deformed the desired amount.

It should be pointed out that in view of the considerable stress necessary to plastically deform the tube and borne by bearing plates 28 and 40 against end supports 11 and 13, it has been found desirable to protect end supports 11 and 13 and adjoining tubes 14 by inserting a cushioning material 30 and 42 between the bearing plates and the end supports. Here a urethane pad has proved adequate although any energy absorbing material may be utilized.

Returning now to the operation of the invention apparatus, once the tube has been plastically deformed the desired amount, the power means 36 and anchoring means 24 are disengaged from inserts 16 and 32 and the inserts are removed from the bore 20 of tube 14. In the example of the invention the inserts are readily removed by application of heat to release the bond effected by bonding agent 22. Any source of heat may, of course, be utilized to accomplish the desired result; however, it has been determined most expedient to use a soldering iron having a hollow head adapted to be positioned over the tube end and insert with heat applied to approximately 300° F. An impact ram is then threaded into the insert. The force of the ram in combination with the applied heat breaks the bond and the inserts are easily removed without resulting in damage to the interior wall of tube 14.

Although a preferred embodiment of this invention has been shown and described, it is to be understood that various adaptations and modifications may be resorted to without departing from the scope of the appended claims.

We claim:

1. An apparatus for stretching a tube positioned between end supports, comprising in combination:
    (a) a power means capable of effecting plastic deformation of the tube,
    (b) a first anchoring means, including a bearing plate, connected to said power means and disposed so that said bearing plate abuts one of the end supports in which the tube is positioned,
    (c) means operably connecting said power means to the interior wall of the tube so that a stress can be exerted on said tube substantially parallel to its longitudinal axis and,
    (d) a second anchoring means operably connected to the tube at the end opposite that to which said power means is attached, to preclude movement of the tube from its end support when the power means is actuated.

2. An apparatus as defined in claim 1 wherein sensor means is disposed adjacent the end of the tube to which the power means is connected so that when the tube is stretched beyond its elastic limit a distance sufficient to bring it into contact with said means no further stress will be exerted by the power means.

3. An apparatus for stretching a tube positioned between end supports comprising in combination:
    (a) a power means capable of effecting plastic deformation of the tube,
    (b) a first anchoring means, including a bearing plate, connected to said power means and disposed so that said bearing plate abuts one of the end supports on which the tube is positioned,
    (c) a first and second insert each having a bore therethrough, adapted to be positioned within the bore of the tube, one insert immediately adjacent one end of the tube and the other immediately adjacent the opposite end of the tube,
    (d) means to secure said inserts within the bore of the tube,
    (e) power connecting means operably connecting said power means to said first insert so that a stress can be exerted on said tube substantially parallel to its longitudinal axis,
    (f) a second anchoring means including a bearing plate, disposed so that said bearing plate abuts the end support opposite that to which the power means is anchored,
    (g) anchor connecting means operably connecting said second anchoring means to said second insert to preclude movement of the tube from its end support when the power means is actuated, and
    (h) sensor means disposed adjacent the end of the tube to which the power means is connected so that when the tube is stretched beyond its elastic limit a distance sufficient to bring it into contact with said means no further stress will be exerted by the power means.

4. An apparatus according to claim 3 in which said insert bores are threaded, said power connecting means is a threaded piston adapted to be threaded into said first insert, said anchor connecting means is a threaded rod adapter to be threaded into said second insert, said means is an anaerobic compound and said sensor means is a pressure trip switch.

5. An apparatus according to claim 4 in which an energy absorbing pad is positioned between each of said bearing plates and end supports so that the adjoining tubes and end supports are not damaged when the bearing plates are drawn against the end supports as the power means is operated to stretch the tube.

References Cited

UNITED STATES PATENTS

| | | | |
|---|---|---|---|
| 2,596,772 | 5/1952 | Hawkes | 72—392 |
| 2,971,556 | 2/1961 | Armstrong et al. | 72—370 |

RONALD D. GREFE, Primary Examiner

U.S. Cl. X.R.

72—302, 370, 378, 392, 465